April 7, 1970     J. F. ENGELBERGER     3,504,868
SPACE PROPULSION SYSTEM
Original Filed Nov. 20, 1963     3 Sheets-Sheet 1
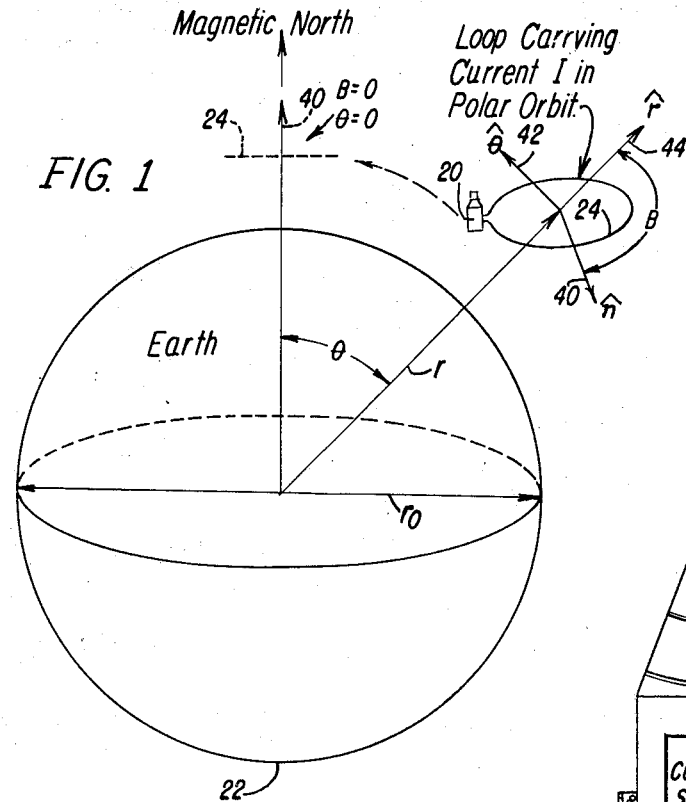
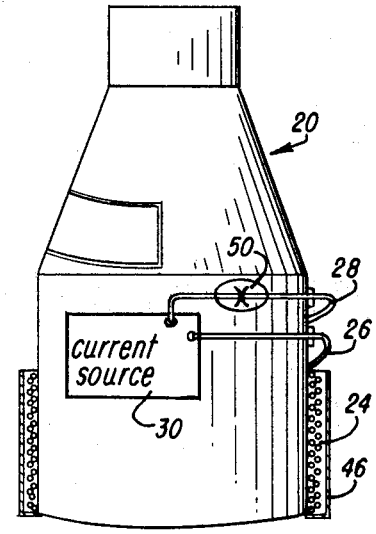
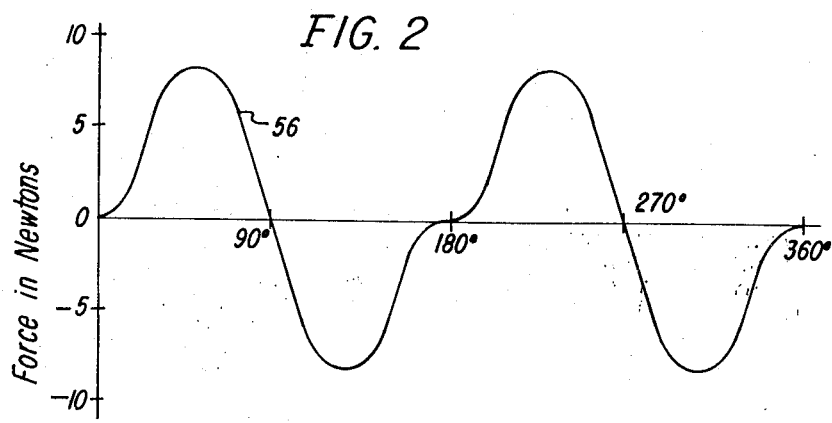
INVENTOR.
Joseph F. Engelberger
BY Mason, Kolehmainen,
Rathburn & Wyss.
ATTYS.

April 7, 1970  J. F. ENGELBERGER  3,504,868
SPACE PROPULSION SYSTEM
Original Filed Nov. 20, 1963  3 Sheets-Sheet 2

INVENTOR.
Joseph F. Engelberger
BY Mason, Kolehmainen,
Rathburn & Wyss.
ATTYS.

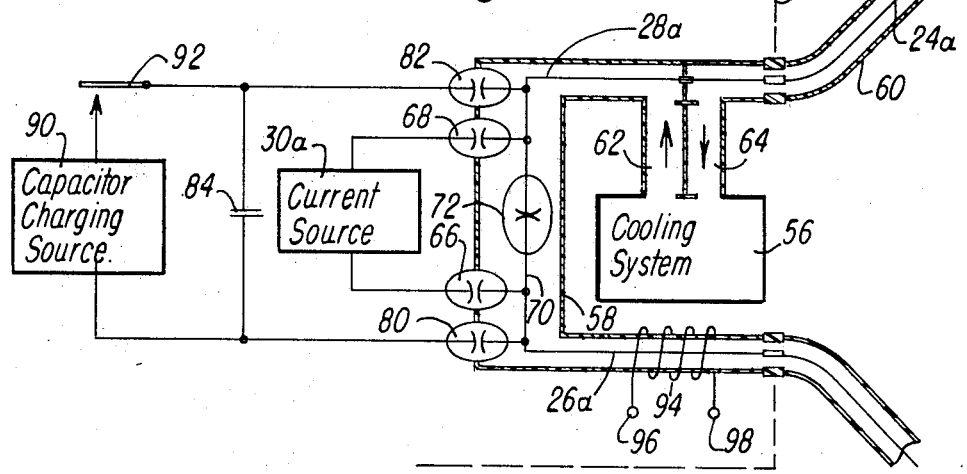
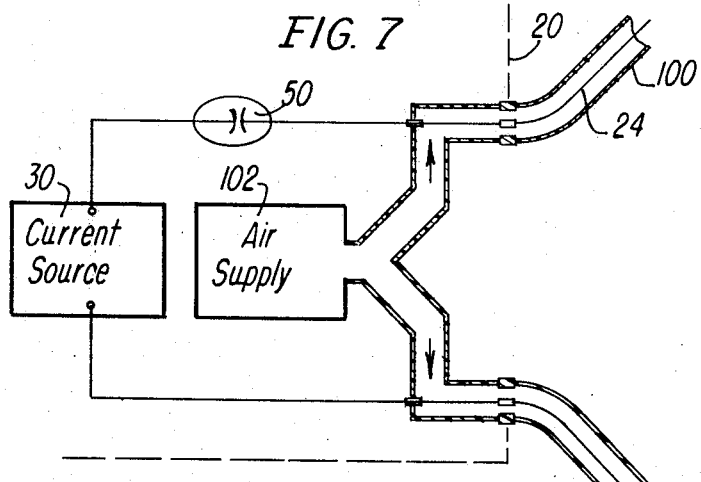
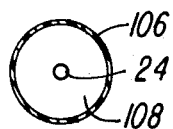
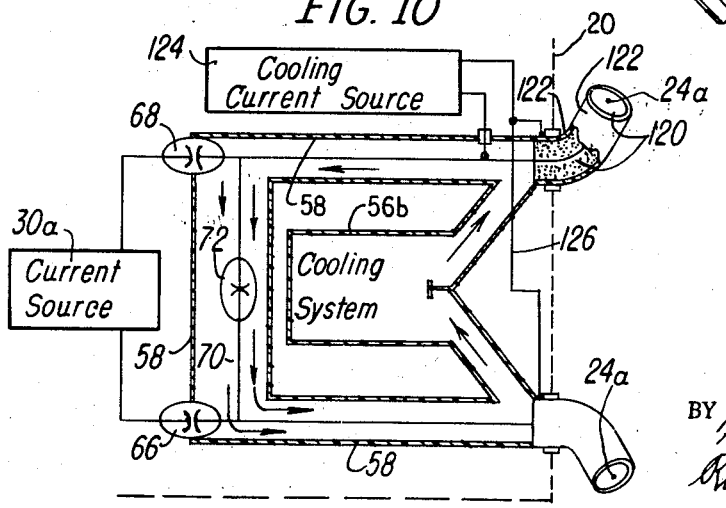
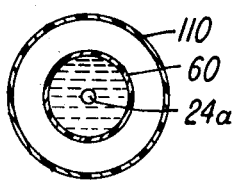

United States Patent Office 3,504,868
Patented Apr. 7, 1970

3,504,868
SPACE PROPULSION SYSTEM
Joseph F. Engelberger, Newtown, Conn., assignor to Consolidated Controls Corporation, Bethel, Conn., a corporation of New Mexico
Continuation of application Ser. No. 324,928, Nov. 20, 1963. This application May 15, 1967, Ser. No. 638,666
Int. Cl. B64c
U.S. Cl. 244—1                                  14 Claims

ABSTRACT OF THE DISCLOSURE

A propulsion system for a body moving in a non-uniform magnetic field, for example, along a polar orbit in the earth's magnetic field, which comprises a coil or loop or wire attached to the body and carrying a current to produce an auxiliary magnetic field as the body travels from the equator to one of the earth's magnetic poles. The auxiliary field is terminated as the body moves through the next quadrant so that a net accelerating force is exerted on the body as it moves in said non-uniform field. The coil or loop may be formed of superconductive material and means provided for maintaining this material in its superconductive state.

---

This is a continuation of application Ser. No. 324,928 filed Nov. 20, 1963, now abandoned.

The present invention relates to a space propulsion system, and, more particularly, to a space propulsion system which may be employed for spacecraft acceleration after the spacecraft has been placed in orbit.

While propulsion system for rockets and other short range space vehicles have customarily employed chemical propellants, either liquid or solid, to provide the desired accelerating force for the spacecraft, it is recognized that the performance of these chemical propellants is limited and for long term or extreme distance space missions better space propulsion systems are required. Certain arrangements have been proposed to provide performance characteristics superior to chemical propellants. One such arrangement employs nuclear fission wherein a nuclear reactor heats a working fluid such as hydrogen or helium in liquid form and the heated fluid is channeled through a nozzle in conventional rocket fashion. In another arrangement ionized particles, which are produced by a source of electrical power on the spacecraft, are ejected at high velocity to obtain thrust. The accelerating force obtained with an ion powered propulsion system is very low and hence would be most useful for operation in space after chemical or nuclear rockets have provided the initial boost from the ground and have placed the vehicle in orbit. A further arrangement proposes to employ photons of light to provide the necessary thrust. While the ejected photons would provide extremely high specific impulses, development of any appreciable thrust would require radiation of tremendously intense beams of light. Other arrangements such as the use of air jets, or the like, have been employed for the maneuvering of spacecraft when in orbit.

In all of the above described arrangements for developing a propulsive force for space navigation the force is developed by the action of a stream of material escaping through an exhaust nozzle which creates a reaction force, in accordance with Newton's third law of motion, in the direction the space vehicle is moving. In such systems the mass of material to be ejected must necessarily be carried by the spacecraft itself and hence for longer missions an increasingly large mass must be provided in the spacecraft which necessarily limits the weight of equipment or personnel which can be carried. Also, the maximum distance which can be travelled by the space vehicle is limited by the maximum weight of material which can be orbited. This makes it extremely difficult to have adequate mass for long distance trips such as interstellar missions and the like.

It is a primary object of the present invention to provide a new and improved space propulsion system in which thrust is produced without the development of physical reaction forces.

It is another object of the present invention to provide a new and improved space propulsion system in which thrust is developed without requiring the dissipation of any mass carried by the space vehicle itself.

It is a further object of the present invention to provide a new and improved space propulsion system wherein the force developed by interaction of a magnetic field established in the general vicinity of the spacecraft with a surrounding non-uniform magnetic field is employed to accelerate the vehicle.

It is another object of the present invention to provide a new and improved space propulsion system which is capable of accelerating an already orbiting space vehicle by utilizing the interaction of a localized magnetic field established in the general vicinity of the spacecraft rounding non-uniform magnetic field of the primary body around which the vehicle is orbiting.

It is a further object of the present invention to provide a new and improved space propulsion system wherein navigation of a vehicle through space is accomplished by selectively establishing a localized magnetic field in the vicinity of the spaceship which interacts with a non-uniform magnetic field in which the spaceship is moving to produce an accelerating force during periods when this magnetic field is created.

Another object of the present invention resides in the provision of a new and improved space propulsion system in which thrust is developed by magnetic interaction between a local magnetic field set up in the general vicinity of the spacecraft and a surrounding non-uniform magnetic field and wherein facilities are provided for setting up a magnetic field of sufficient strength to produce thrust of substantial magnitude.

A further object of the present invention resides in the provision of a new and improved space propulsion system in which thrust is developed by magnetic field interaction between a local magnetic field set up in the general vicinity of the spacecraft and a surrounding non-uniform magnetic field and wherein facilities are provided for minimizing the power required to set up said local magnetic field.

A still further and specific object of the present invention resides in the provision of a new and improved space propulsion system in which thrust is developed by providing a conductive loop of a large area adjacent the spacecraft and passing a large current through this loop so that an accelerating force is exerted on the spacecraft due to the interaction of the magnetic field set up by current flow in the conductive loop with a surrounding non-uniform magnetic field.

Briefly, the present invention utilizes the non-uniformity of magnetic fields in space to produce thrust for the spacecraft by magnetic field interaction and without requiring the physical ejection of any material from the spacecraft. A local magnetic field is established in the general vicinity of an orbiting spacecraft. This local magnetic field interacts with the non-uniform magnetic field in which the spacecraft is moving. If the spacecraft is orbiting about the earth, the localized magnetic field would interact with the earth's magnetic field. The earth's magnetic field is non-uniform in certain directions and interaction between the local magnetic field and the earth's magnetic field will produce net translational forces in certain directions corresponding to the non-uniform pattern of the earth's magnetic field. In accordance with the present invention the movement of the spacecraft is coordinated with the non-uniform pattern of the earth's magnetic field by placing the spacecraft in a polar orbit so that a component of the net translational force produced by the above described magnetic field interaction is in the correct direction to accelerate the spacecraft itself.

While the earth's magnetic field is non-uniform in certain directions this non-uniformity is very slight. Accordingly, if conventional apparatus is employed to establish the local magnetic field the resultant magnetic field interaction, even if properly correlated, is unable to produce a substantial accelerating force for the spacecraft. In accordance with a further aspect of the invention an arrangement is provided for producing a substantial accelerating force while employing a localized magnetic field of realizable field strength. More particularly, an elongated conductor is positioned in the form of a conductive loop outside the spacecraft but physically connected thereto. A current is passed through this loop so that a localized magnetic field similar to a magnetic dipole is set up in space adjacent the spacecraft. The conductive loop is made to have an extremely large diameter so that even though the non-uniformity of the earth's magnetic field is slight a net translational force of substantial magnitude is exerted on the loop which accelerates the same. Since the spacecraft is connected to the loop it is pulled along with it and is also accelerated. When the spacecraft is orbiting in a polar orbit a force tending to accelerate the spacecraft is produced only during alternate quadrants of each orbit. The present invention includes an arrangement for selectively establishing the local magnetic field so that forces due to magnetic field interaction may be selectively produced only in these alternate quadrants with the result that a net accelerating force is produced on the spacecraft.

In accordance with a further aspect of the invention, the current carrying loop conductor is formed of a superconductive material and the conductor is held in the temperature region in which superconductivity occurs. Under these conditions, an extremely large current can be made to flow in a conductor of relatively small dimensions so that a localized magnetic field of substantial field strength is produced in the vicinity of the spacecraft. Furthermore, once this current has been established in the superconductive loop conductor it will continue to flow after the current source is removed due to the fact that the superconductor has essentially zero resistance. This means that the amount of power required to maintain the localized magnetic field in the vicinity of the spaceship is greatly reduced over that required with a conductor having normal resistance.

In accordance with a further aspect of the invention, when it is desired to terminate the current flowing in the superconductor so as to remove the localized magnetic field for navigation purposes, the current flowing in the superconductor can be employed to charge a storage capacitor arrangement so that the charge may be held until the next period in which the magnetic field is to be established. The stored charge may then be connected to the superconductor to establish the desired current flow therein during the next period in which a localized magnetic field is to be produced.

The invention, both as to its organization and method of operation, together with further objects and advantages thereof, will best be understood by reference to the following specification taken in connection with the accompanying drawings in which:

FIG. 1 is a perspective diagrammatic view illustrating the features of the present invention;

FIG. 2 is a graph of the variation of the component of force produced by magnetic field interaction in the space propulsion system of the present invention tending to accelerate the space vehicle as it travels around the earth in a polar orbit;

FIG. 3 is a side view of a spaceship provided with a space propulsion system according to the present invention in which the current carrying conductor is stowed in compact form;

FIG. 6 is a schematic diagram of a further embodiment of the invention in which a charge storage system is provided to conserve power;

FIG. 7 is a schematic diagram of another embodiment of the invention illustrating an arrangement for positioning the loop conductor in a desired configuration;

FIG. 8 is a cross-sectional view of a shielding arrangement for the loop conductor of the space propulsion system of the present invention;

FIG. 9 is a cross-sectional view of an alternative loop conductor shielding arrangement; and FIG. 10 is a schematic diagram of another embodiment of the invention wherein thermoelectric cooling is employed to cool the space propulsion loop.

Figure 4:
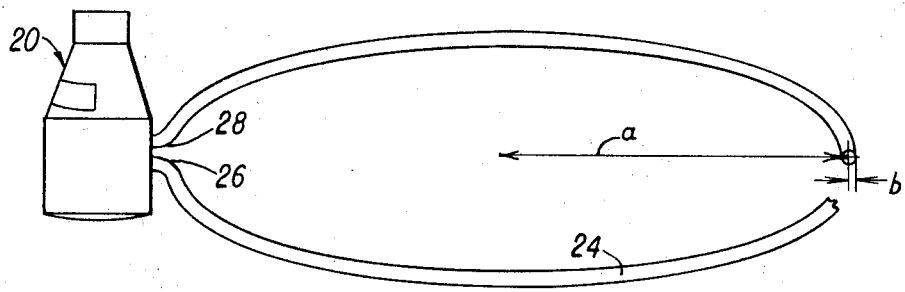
FIG. 4 is a perspective view of a spaceship and its associated current loop illustrating the manner in which a localized magnetic field is developed in the vicinity of the spacecraft in the space propulsion system of the present invention.

Referring now to the drawings and more particularly to FIGS. 1, 2, 3, and 4, the space propulsion system of the present invention is illustrated as comprising a spaceship indicated generally at 20 which, in the arrangement shown in FIG. 1 has been placed in a polar orbit about the earth 22 by any conventional launching means such as a chemical or nuclear rocket or other suitable arrangement. External to the spaceship 20 but physically connected thereto is a large conductive loop which may comprise an elongated conductor 24 the ends 26 and 28 of which are physically connected to the spaceship 20 in such manner that an electrical current may be passed through the loop conductor 24. The conductor 24 is of such length that it forms a conductive loop many times the diameter of the spaceship 20 and when a current developed by a suitable current source carried by the spaceship 20, such as the current source 30 shown in FIG. 3, is passed through the conductor 24 a localized dipole magnetic field is set up in the vicinity of the spacecraft 20. The present invention employs the non-uniformity of the magnetic field surrounding the moving spacecraft to develop a translational force on the spacecraft due to the interaction of the locally developed magnetic field of the loop 24 with the non-uniform components of the magnetic field in the surrounding medium. As will be described in more detail hereinafter, this translational force can be made sufficiently large to produce a substantial accelerating force on the moving spacecraft which can be controlled in such manner as to accelerate the spacecraft in a particular direction.

In considering the space propulsion system of the present invention, it should first be noted that when a magnetic dipole is positioned in a uniform magnetic field it experiences no net translational force tending to move the dipole in a particular direction. On the contrary, the magnetic dipole senses a force couple tending to rotate the dipole until its axis is parallel to the lines of force of the uniform magnetic field. Thus, considering a simple bar magnet, if this magnet is positioned in a uniform magnetic field with its axis at an angle to the direction of this magnetic field a torque is exerted on the bar magnet which tries to align this magnet parallel with the magnetic flux lines of the uniform magnetic field. However, once the magnet has been rotated into such alignment no force tending to move the bar magnet is experienced.

If, now, the magnetic dipole is positioned in a non-uniform magnetic field a translational force is exerted on the dipole which can be expressed in Cartesian co-ordinates by the following series of equations:

$$Fx = Mx\frac{\partial Hx}{\partial x} + My\frac{\partial Hy}{\partial x} + Mz\frac{\partial Hz}{\partial x} \quad (1)$$

$$Fy = Mx\frac{\partial Hx}{\partial y} + My\frac{\partial Hy}{\partial y} + Mz\frac{\partial Hz}{\partial y} \quad (2)$$

$$Fz = Mx\frac{\partial Hx}{\partial z} + My\frac{\partial Hy}{\partial z} + Mz\frac{\partial Hz}{\partial z} \quad (3)$$

where F=force, M=dipole moment, and H=magnetic field strength of the non-uniform magnetic field.

While Equations 1, 2 and 3 are the general equations expressing the $x$, $y$ and $z$ components of net translational force in a non-uniform magnetic field, it will be helpful to convert these equations to polar co-ordinates in order to evaluate the particular advantages of the conductive loop arrangement shown in FIG. 1. Thus, in considering the net translational force which is exerted on the loop 24 when it is moving in a polar orbit about the earth 22, it is assumed that the loop 24 is orbiting at a distance $r$ from the center of the earth, the earth's radius being indicated as the distance $r_o$. When the loop 24 is moving in a polar orbit this loop will, at every point in space, experience a torque which aligns the normal to the loop, indicated by the vector 40 in FIG. 1, with the earth's magnetic field at that particular point. In FIG. 1 $\theta$ equals the angle between the magnetic north pole of the earth and the radius vector $r$ and B is the angle between the radius vector and the normal 40 to the current carrying loop. In the present invention, the loop 24 is caused to move in a polar orbit and the force component $$\hat{\theta}$$

in the direction indicated by the vector 42 is used to accelerate the spacecraft 20. A second force component $$\hat{r}$$

which is perpendicular to the component 42 and is directed along the radius vector line, indicated by the vector 44, is also present but this force component does not function to produce acceleration. There is also a third force component (not shown) which is perpendicular to a plane containing both the vectors 42 and 44, but there will be no net translational force component in this direction because the earth's magnetic field is uniform in this direction. Thus, in travelling around the earth at the equator very little variation in the strength of the earth's magnetic field is experienced, except for localized anomalies. Accordingly, insofar as translational force in a non-uniform magnetic field is concerned we can consider only the components 42 and 44. On this basis, Equations 1, 2 and 3 can be converted to polar co-ordinates and show that the net translational force $\overline{F}$ on the loop 24 is given by the equation:

$$\overline{F} = \frac{5 \times 10^{-11} NIA}{\left(\frac{r}{r_o}\right)^4} [-\hat{r}(\cos B \cos \theta + \tfrac{1}{2} \sin B \sin \theta)$$

$$+ \hat{\theta}(-\tfrac{1}{3}\cos B \sin \theta + \tfrac{1}{6} \sin B \sin \theta)] \quad (4)$$

where N is the number of turns in the loop 24, I is the current flowing in the loop 24 in amperes, A is the cross-sectional area of the loop 24 in square meters, $r$ is the distance from the center of the earth to the center of the loop 24 and $r_o$ is the radius of the earth, both $r$ and $r_o$ being expressed in meters and $\overline{F}$ being expressed in Newtons.

From Equation 4 it can be seen that the force $\overline{F}$ in the direction of the component 42 will vary from a value of zero at the north and south poles and at the equator to a maximum value at some point intermediate the pole and equator in each quadrant. It may be helpful in visualizing this variation in the component 42 of the force $\overline{F}$ to analyze the pertinent forces on the loop at two points, the equator and the north pole, when the loop is moving in a polar orbit from the equator to the north pole. When the loop is at the equator, the plane of the loop will be in the plane of the equator, i.e., the axis of the loop will be parallel to the polar axis of the earth. At this point, the force exerted on the loop will be directed along the radius vector 44 so that this force component either tends to pull the loop toward the earth or pull it away from the earth, depending on the direction of current flow in the loop. However, at this point in the orbit no force is exerted on the loop in the direction of movement of the loop 24 so that the $\theta$-directed component of the translational force $\overline{F}$ in the direction of the vector 42 is zero. When the loop 24 is directly over the north pole, the axis of the loop will again be parallel to the axis of the earth and a force will again be exerted on the loop along the radius vector 44. However, this force component will again only tend to move the loop toward or away from the earth and there will be no component of force in the direction of movement of the loop. Accordingly, at this point also the $\theta$-directed component 42 of the translational force $\overline{F}$ will again be zero. Furthermore, this $\theta$-directed force will reverse in sign in alternating quadrants. FIG. 2 shows the variation in the $\theta$-directed force component 42 with the angle $\theta$ throughout the four quadrants of the earth. Since angle B is predetermined for every angle $\theta$ by the field distribution of the earth's magnetic field, it can be shown that the angle B is related to the angle $\theta$ by the following formula:

$$\tan B = \tfrac{1}{2} \tan \theta \quad (5)$$

From FIG. 2 it will be seen that the $\theta$-directed force reverses in each successive quadrant so that the net acceleration in the direction of travel of the loop 24 for a complete orbit would be zero if current is supplied to the loop during the entire orbit. In accordance with a further feature of the invention a net positive acceleration for the loop 24 is obtained by reducing the current flowing in the loop 24 to zero during travel through those quadrants wherein the force exerted on the loop 24 would be decelerating. Also, in accordance with a further feature of the invention it is possible to obtain a propulsive force during at least a portion of the total travel through a decelerating quadrant by tumbling the loop 24 and reversing the current flow therein, as will be described in more detail hereinafter.

When the loop 24 is positioned over the north pole both the angle $\theta$ and the angle B become zero since the loop 24 tends to orient itself with its normal 40 aligned with the earth's magnetic field which is essentially vertical over the poles. This condition of the loop 24 is indicated in dotted lines in FIG. 1. Equation 4 can then be conveniently reduced to the following:

$$F_o = \frac{5 \times 10^{-11} NIA}{\left(\frac{r}{r_o}\right)^4} \quad (6)$$

where $F_o$ represents the maximum force which will be experienced by the loop 24 in the direction of the radius vector $$\hat{r}$$

and other quantities are the same as in (4). While, as noted previously, the $\theta$-directed component is utilized to produce acceleration of the loop 24, it is somewhat simpler to use Equation 6 to examine the effect of the various parameters on the maximum translational force which can be produced. However, it will be understood that the maximum $\theta$-directed force will be smaller than $F_o$ of Equation 6 and will occur at an intermediate point in each quadrant, as shown in FIG. 2.

From Equation 6 it can be seen that the force exerted on the loop 24 will vary directly as the current I and as the area A of the loop. With regard to the parameter N, it will be seen that if the loop 24 comprises two turns rather than one turn of wire the net translational force given by Equations 4 and 6 will be twice as great. However, the acceleration which is imparted to the loop 24, neglecting for the moment any consideration of the weight of the spacecraft 20 itself is inversely proportional to the mass of the loop 24. Accordingly, when the loop 24 has two turns the mass of material in the loop doubles so that the acceleration is independent of the number of turns in the loop 24. The loop 24 is therefore preferably only a single turn and may conveniently comprise an elongated conductor the ends of which are connected to the spaceship 20.

The elongated conductor 24 is preferably stored in compact form on the spacecraft 20 until this spacecraft has been placed in orbit. For example, the loop conductor 24 may be coiled around the exterior of the spacecraft 20 in the manner shown in FIG. 3 and a removable housing 46 may be provided over the coils of the conductor 24 to protect the same while the spacecraft 20 is being placed in orbit. After the spacecraft 20 is orbiting in a polar orbit the housing 46 may be removed or discarded by any suitable arrangement and the coiled portion of the loop conductor 24 may then be released from the spacecraft 20 so that the conductor 24 is physically connected to the spacecraft 20 only at the end portions 26 and 28 thereof. However, since the spacecraft 20 is in orbit the loop 24 is essentially weightless and it would be free to assume any random configuration. In accordance with a further aspect of the invention, the conductor 24 is caused to assume a circular loop configuration by passing a substantial current through the conductor 24 after it has been uncoiled and is connected to the spacecraft 20 only at the end portions thereof. When a substantial current is passed through the conductor 24 this conductor is free to form a circular loop due to the hoop stresses developed in each incremental portion of this conductor when a magnetic field is set up about each incremental portion as a large current is passed therethrough. Accordingly, the passage of current through the loop 24 is utilized in accordance with the invention to achieve an extended loop shape which covers a large area and, as shown by the factor A in Equation 4, provides a large accelerating force component. In this connection it is noted that the only force tending to prevent the formation of such a loop will be the stiffness of the conductor 24 itself. Accordingly, the conductor 24 is preferably quite flexible so that magnetic repulsion forces due to current flow in the conductor will be sufficient to cause the conductor to form an extended loop. It is also noted that the loop formed by the conductor 24 need not be circular so long as the loop encompasses a substantial area. Thus, the loop 24 may be square, rectangular, or, in fact, of irregular configuration as long as the area cut by the loop is substantial.

Current from current source 30 may be selectively applied to the conductor 24 by any suitable switching arrangement such as the vacuum type circuit interrupter indicated generally at 50 in FIG. 3, which may be controlled either manually or by suitable electromagnetic or electronic means. Obviously, any other suitable type of switching device may be employed which will interrupt the current flowing in the loop 24 without excessive arcing or other such difficulties, as will be readily understood by those skilled in the art. It will also be understood that the current source 30 may comprise any suitable source of electrical energy capable of functioning properly in space and supplying a current of the required magnitude to a load consisting of the impedance of the conductive loop 24 at its operating temperature. For example, the source 30 may comprise conventional or solar batteries, thermionic generators, nuclear power sources, or turbo generator types of rotating machinery.

Assuming that the spacecraft 20 has been placed in orbit and that the conductor 24 has been released from its coiled position adjacent the spacecraft, if a current of substantial magnitude is applied to the conductor 24 at a time when the spaceship 20 is passing over the equator and is moving toward the north pole, for example, the loop 24 will experience an accelerating force which varies in accordance with the positive portion 56 of the curve of FIG. 2, it being understood that the spaceship is actually travelling from 90° to 0 as portrayed in FIG. 2. It will also be seen that the maximum accelerating force is exerted on the loop 24 at a point approximately midway between the equator and the north pole, and this force tapers off to zero at the equator and at the north pole. This accelerating force exerted on the loop conductor 24 is transmitted to the spacecraft 20 since this spacecraft is physically connected to the loop at the end portions 26, 28 thereof. Accordingly, the spacecraft 20 is accelerated during its travel from the equator to the north pole in accordance with the formula given in Equation 4. When the spacecraft 20 reaches the north pole, the current flowing through the loop 24 may be terminated by opening the switch 50 so that a localized magnetic field is no longer produced in the vicinity of the spacecraft 20 and no magnetic field interaction takes place with the earth's magnetic field so that no decelerating force is exerted on the spacecraft 20 during its travel through the next quadrant from the north pole back to the equator. When the spacecraft again reaches the equator, the current is again applied to the loop conductor 24 by closure of the switch 50 and a further accelerating force is exerted on the spacecraft during travel through the third quadrant. In a similar manner current is shut off during the fourth quadrant so that no deceleration force is exerted on the spacecraft. It will thus be seen that with each orbit of the spacecraft 20 accelerating forces are exerted thereon tending to accelerate the spacecraft 20 in a particular direction, i.e., the direction of the component 42 in FIG. 1. The velocity of the spacecraft may thus be increased sufficiently to permit the spacecraft to escape from the earth's gravitation field and by controlling the application of current to the loop 24 in relation to movement of the spacecraft some degree of control can be exercised over the escape path of the spacecraft.

In order to increase the accelerating force exerted on the spacecraft 20, the movement of the loop 24 through the decelerating quadrants may at least partially be utilized by reversing the direction of current flow through the loop 24. If the current in the loop 24 is reversed, by means of a suitable reversing switch (not shown), a tumbling couple is introduced which will swing the loop once again into a decelerating orientation. However, considering the inertia of this loop, tumbling will take place at a relatively slow rate and current can be selectively applied to the loop during those periods of the loop reversal in which a net accelerating force is obtained. Both the current and its direction of flow in the loop would have to be coordinated with loop orientation as measured by suitable instrumentation so that current would be applied to the loop 24 primarily when a net accelerating force component is produced.

Figure 5:
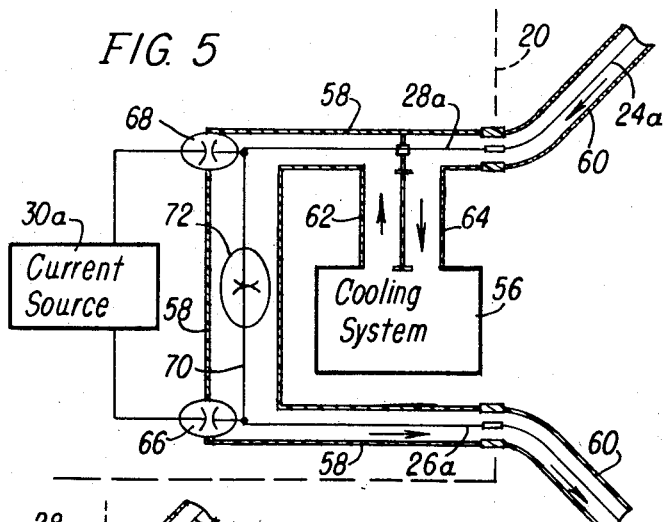
FIG. 5 is a schematic diagram of an alternative embodiment of the invention in which a cooling system is employed for the conductive loop.

As discussed heretofore, Equation 4 shows that the accelerating force is directly proportional both to the current flowing in the loop conductor 24 and the area of the loop formed by this conductor. In accordance with a further important aspect of the invention the conductor 24 may be made of a superconductive material and this conductor operated in the temperature region in which superconductivity occurs. By operating the loop conductor 24 as a superconductor the maximum permissible current which can be forced through the conductor 24 is substantially increased, as will be readily understood by those skilled in the superconductivity art. Furthermore, since the resistance of the conductor 24 in the superconductivity region is essentially zero, the current, once it is established in the loop 24, will continue to flow without requiring substantial additional energy from the main current source. An arrangement in which the conductor 24 may be operated as a superconductor is shown in FIG. 5 wherein the loop conductor 24a is made of a suitable conductive material. In the arrangement of FIG. 5 the superconductor 24a is operated in the temperature region where superconductivity occurs by means of a cooling system indicated generally at 56 which is employed to circulate cryogenic cooling fluid through a conduit 58 within the spacecraft 20 and through a flexible sleeve 60 which surrounds the superconductor 24a outside the spaceship. The cooling fluid, which is circulated by the cooling system 56 through the above described conduit 58 and sleeve 60 in the direction indicated by the arrows in FIG. 5, may comprise any suitable gas or liquid which is operative to maintain the temperature of the superconductor 24a in the region in which this conductor exhibits superconductivity, as will be readily understood by those skilled in the art of cryogenics.

The cryogenic fluid circulated by the system 56 is preferably a low temperature gas since the weight of the circulating medium will be much less than if a cooling liquid is used. However, if the cooling effect of a suitable gas is insufficient the cryogenic fluid may be a liquid such as liquid helium (Helium 3 or Helium 4). Also, due to the length of the loop conductor 24a the cooling fluid may be initially pumped into the sleeve 60 as a liquid and will absorb sufficient heat during its travel around the loop to become a gas. It may also be desirable to provide self-powered cryogenic cooling stations spaced along the length of the sleeve 60 so that the circulating fluid may be cooled down at several points along the length of the loop. Also, when such intermediate cooling stations are employed the sleeve 60 may be provided with a plurality of conduits or passageways around the loop conductor and the cooling fluid may be circulated back and forth between adjacent cooling stations rather than being circulated around the entire length of the loop conductor. Obviously, such arrangements are given only by way of example and any other suitable arrangement for circulation of a suitable cooling fluid and maintaining the conductor 24a at a superconductive temperature may be employed, as will be readily understood by those skilled in the art of cryogenics. In this connection it will be understood that the cooling system indicated generally at 56 may include any suitable type of refrigeration unit for maintaining the temperature of the cooling fluid at the desired value and suitable means for circulating the cooled fluid through the sleeve 60 and conduit 58.

Since the area of the loop formed by the conductor 24a is necessarily large so that a large translational force is exerted on the spacecraft 20, there will necessarily be some heating of the cooling fluid circulated by the system 56 through the sleeve 60. Accordingly, the superconductive material of the conductor 24a is preferably chosen so that it is able to remain superconductive at the highest possible temperature. For example, the superconductor 24a may comprise niobium-tin ($Nb_3Sn$) which remains superconductive at temperatures as high as 15 to 20 degrees Kelvin. Obviously, other superconductive materials may be employed insofar as the present invention is concerned, the only requirement being that the conductor can be held to a superconductive temperature throughout the length of the conductive loop formed by the conductor 24a. By using a superconductor such as niobium-tin which is superconductive at 15° K. the possibility of cooling the conductor by circulating a low temperature gas is greatly enhanced since cryogenic fluids such as liquid helium have a boiling point of 3 to 4° K. at relatively low pressures and may readily be operated as a gas at 15 to 20° K. In this connection it will be understood that the sleeve 60 which surrounds the superconductor 24a and contains the cooling fluid of the system 56, is preferably flexible so that the sleeve 60 and conductor 24a may be coiled up during the period when the spaceship 20 is delivered to orbit and will not interfere with the formation of a circular loop configuration when current is applied to the conductor 24a. Also, the sleeve 60 is constructed of a suitable material which will withstand the temperature and pressure of the circulated cooling medium and is spaced concentrically with the conductor 24a by suitable spacers having low heat transfer properties. In this connection it will be understood that the positioning of the conductive loop around the spacecraft 20, as shown in FIG. 3, is merely illustrative and any other suitable arrangement may be employed for storing the conductor 24, or the conductor 24a and its associated sleeve, in compact form on or about the spaceship 20 for delivery into orbit. Also, it will be understood that any suitable means may be employed for releasing the stored conductor after the spaceship has been placed in orbit.

In the arrangement of FIG. 5 an extremely large current can be passed through the superconductor 24a while employing a superconductor which has a relatively small conductor diameter. Accordingly, it is necessary to provide suitable switching means which will function properly to interrupt or transfer current flow to and from the superconductive loop 24a. To this end, the current source 30a within the spaceship 20 is arranged to be connected through a pair of vacuum type circuit interrupters indicated generally at 66 and 68, which are positioned in insulated housings mounted in one wall of the conduit 58, to the end portions 26a and 28a, respectively, of the superconductor 24a. A shunt conductor 70, also of superconductive material, is connected between the end portions 26a and 28a of the conductor 24a through a vacuum type circuit interrupter 72. After the superconductor assembly has been released from the spacecraft and cooling fluid has been circulated through the sleeve 60 by the cooling system 56, the switches 66 and 68 are closed while the switch 72 is held open. Current then flows from the source 30a through the closed switches 66 and 68 and through the superconductive loop 24a. Once the current in the conductive loop 24a has been raised to its maximum value the shunting switch 72 is closed so as to complete a conductive path through the conductor 70 for the loop 24a independently of the current source 30a. The switches 66 and 68 may immediately thereafter be opened so as to disconnect the current source 30a from the conductive loop 24a. Due to the fact that the conductor 24a is operating in the superconductive region, the large current established in this conductor by the source 30a will continue to flow through the shunt 70 without substantial diminution of the current strength. This is because the conductor 24a when operating in the superconductive region has essentially zero resistance. Accordingly, a very intense localized magnetic field is developed in the vicinity of the spaceship 20 without requiring a steady application of power from the current source 30a. Furthermore, by employing a single turn loop of large diameter to set up the localized magnetic field the current flow through this loop may be very large without developing hoop stresses which would burst the loop apart. If a relatively small diameter loop were used, or if a multi-turn solenoid were used as is done in many instances where intense magnetic fields are required, the maximum permissible current flow would be severely limited due to the hoop stresses which would be developed as well as the forces developed between adjacent turns of a multi-turn coil. With a large diameter single turn coil these stresses are minimized and large currents, in the order of thousands of amperes, may be passed through the conductor 24a without physical damage to the loop. Currents of these magnitudes will obviously increase greatly the force available to accelerate the spacecraft.

It will be noted that the magnetic field of the loop conductor 24 will deflect charged particles from their normal paths when they enter the magnetic field set up by the loop conductor. Such deflection will function to shield the occupants of the spaceship from these particles when a localized magnetic field of substantial strength is produced. This is an additional advantage of the space propulsion system of the present invention.

When it is desired to interrupt current flow in the conductor 24a so that no deceleration is produced during travel through alternate quadrants, as discussed in detail heretofore, the switch 72 is opened while the switches 66 and 68 are also held open. The localized magnetic field set up by current flow in the superconductor 24a may thus be controlled so that spacecraft navigation by magnetic field interaction may be achieved. In this connection it will be understood that the switches 66, 68 and 72 may be controlled in the desired sequence by any suitable means such as electromagnetic control, or the like.

The temperature of the loop conductor 24a of superconductive material may also be held at the desired low value at which superconductivity occurs by means other than the provision of a suitable cooling fluid around the conductor. Thus, in the embodiment of FIG. 10 an arrangement is shown wherein thermoelectric cooling is employed. In conventional thermoelectric cooling units a pair of conductive terminal plates are provided on opposite sides of a body of material such as bismuth telluride, antimony telluride, bismuth selenide, or a material based on the pseudo-binary system. When a current flows through this material between the terminal plates a cooling effect is produced utilizing the Peltier effect and heat is transferred from one plate to the other. In the embodiment of FIG. 10 the loop conductor 24a is used as one terminal plate of the thermoelectric cooling unit. More particularly, the superconductive loop conductor 24a is surrounded by a tubular layer 120 of a material such as bismuth telluride which exhibits the Peltier effect, and a conductive sheath terminal layer 122 of low resistance is provided in contact with the outer surface of the layer 120. A separate cooling current source 124 is connected to the loop conductor 24a and the conductive terminal layer 122 inside the spaceship. Current from the source 124 thus flows transversely through the layer 120 and the loop conductor 24a and conductive layer 122 act as elongated terminal plates of a thermoelectric cooling unit. The polarity of the source 124 is chosen so that heat is extracted from the loop conductor 24a and is transferred to the layer 122 utilizing the Peltier effect. Since the material 120 is of very low resistance the source 124 is necessarily a low voltage source of high current capacity. Since the conductive layer 122 may have a substantial resistance per unit length along the conductor 24a it will introduce a substantial voltage drop if the source 124 is connected at only one point along the layer 122. Acordingly, the source 124 may be connected to the layer 122 at the other end of the loop conductor, as indicated by the connection 126 and may also be connected to the layer 122 at several spaced points along the length of the loop conductor by means of separate conductors of high current carrying capacity so that sufficient voltage is applied between the layer 122 and the conductor 24a to produce the desired cooling at all points around the loop. In this connection, it will be understood that the current path for the source 124 is through the material 120 whereas the current path for the main current source 30a is through the loop conductor 24a. In order to maintain that portion of the conductor 24a within the spaceship at the desired low temperature, a small auxiliary cooling system 56b is employed in the arrangement of FIG. 10 to circulate a suitable cooling fluid around the portion of the conductor 24a which is positioned within the spaceship between the ends of the tubular layer 120. In the alternative, the layer 120 may be provided around the portion of the conductor 24a within the spaceship so that thermoelectric cooling is used throughout.

In the arrangement of FIG. 5 the shunting conductor 70 and the switch 72 are positioned in the cooling fluid within the conduit 58 and the switches 66 and 68 are mounted in the wall of the conduit 58. Such an arrangement has the advantage that heat loss through the conductors which connect the current source 30a to the switches 66 and 68 is minimized. Since these conductors must carry a large current they are necessarily of large physical dimensions since they are not positioned in the cooling fluid within the conduit 58 and hence are not superconductors. Accordingly, these large conductors would tend to cause a heat loss which would reduce the efficiency of the cooling system 56. However, in the arrangement of FIG. 5 the switches 66 and 68, which are preferably of the vacuum type, are opened once the current has been established in the conductor 24a and by mounting the evacuated envelopes of the switches in the conduit 58 little heat loss is experienced due to these conductors.

Figure 5A:
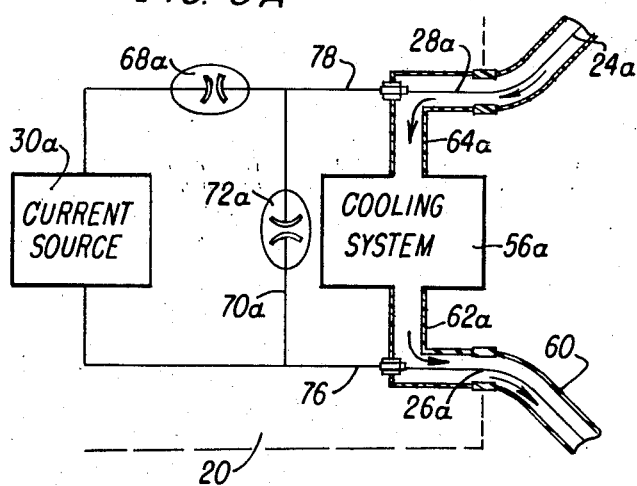
FIG. 5A is a schematic diagram of an alternative arrangement similar to FIG. 5.

In the event that the heat loss in the conductors connecting the current source 30a to the loop 24a is not excessive, the arrangement shown in FIG. 5A may be employed. In this arrangement the cooling system 56a is arranged to cool only the conductor 24a and the end portions 26a and 28a of this conductor are connected directly to large conductors 76 and 78, respectively, which extend through the walls of the cooling inlet 62a and outlet 64a. The shunting conductor 70a and its associated switch 72a are positioned outside the cooling system 56a. Also, in the arrangement of FIG. 5A only a single vacuum type circuit interrupter 68a is employed to connect or disconnect the current source 30a from the loop 24a. All of the conductors outside the cooling system 56a are of sufficient physical size to carry the necessary currents without introducing substantial resistance in the circuit of the conductive loop 24a. However, since the conductors 76, 78 and 70a must necessarily have a certain amount of resistance since they are not operated in the superconductive region, the current circulating in the loop 24a will decrease more rapidly than in the arrangement of FIG. 5 and hence the current source 30a may be periodically connected to the loop 24a by closure of the switch 64a and then opening the switch 72a so as to maintain the current flow in the loop 24a at the required high level.

In the arrangements of FIGS. 4, 5 and 5A, the current in the conductive loop is collapsed by simply opening a suitable circuit interrupter so that the energy represented by this current flow is lost and must be supplied again by the current source 30 or 30a, when a current is to be reestablished in the conductive loop. In the arrangement of FIG. 6 a system is provided for storing the energy represented by current flow in the conductive loop during periods when this current flow is not required. Referring to this figure, the loop conductor 24a is illustrated as a superconductor, as in FIGS. 5 and 5A, and is arranged to be supplied with current from the source 30a through the switches 66 and 68 following which the shunt switch 72 is closed so as to maintain a circulating current in the loop conductor 24a at the required high current level. When it is desired to terminate current flow in the loop 24a, a pair of vacuum type circuit interrupters 80 and 82, which are also mounted in the wall of the conduit 58 and are connected respectively to the end portions 26a and 28a of the conductor 24a, are closed so as to connect a storage capacitor arrangement, indicated generally by the capacitor 84, across the ends 26a and 28a. The shunt circuit interrupter 72 is then opened so as to cause the current circulating in the conductive loop 24a to flow through the switches 80 and 82 and charge the capacitor 84. When the total charge corresponding to the current circulating in the loop 24a is collected on the plates of the storage capacitor means 84 the current in the loop 24a is reduced to zero so that the localized magnetic field set up due to this current flow is collapsed.

When it is desired to re-establish current flow in the conductor 24a for the next period during which an accelerating force is to be exerted on the spaceship 20, the switches 80 and 82 are first closed so that the charge which has been collected on the storage capacitor means 84 is transferred to the conductor 24a and re-establishes the desired current flow in this conductor. As soon as the current flow in the conductor 24a reaches the desired level the shunt switch 72 is closed so that a circulating path is established wholly within the cryogenic fluid of the cooling system 56, following which the switches 80 and 82 may be opened to disconnect the storage capacitor means 84 from the conductive loop circuit.

While the superconductor 24a has essentially zero resistance when it is operated in the superconductive region so that very little energy is dissipated when the above described current is flowing therein, it will be understood that work is being done in accelerating the spacecraft during the period of initial application of current to this conis done will result in a reduction in the amplitude of the current circulating in the loop conductor 24a. The amount of energy thus dissipated must be replenished in some manner so that the strength of the localized magnetic field may be maintained at the desired level. In the arrangement of FIG. 3 this replenishment is automatically supplied by the current source 30 since this current source is continuously connected to the conductor 24 during periods when this loop conductor is carrying current. However, in the arrangement of FIG. 6 wherein the loop conductor 24a is a superconductor and the current source 30a is disconnected from the superconductor except during the period of initial application of current of this conductor, it is necessary to supply energy periodically to compensate for the reduction in current which is experienced as the spacecraft is acelerated. This may be done in any one of a number of ways. For example, the current source 30a may be periodically reinserted into the conductive loop 24a so as to bring the current level flowing in this loop to the desired value. Such an arrangement can likewise be used in FIG. 5A. In the alternative, a capacitor charging source indicated generally at 90, may be arranged to supply a small amount of current to the capacitor 84, in a manner similar to trickle charging of a battery, through a switch 92. When the switch 92 is closed a small charging current is supplied to the capacitor 84 and this charge will be added to the charge collected on this capacitor when the current in the loop conductor 24 is interrupted in the manner described heretofore. Accordingly, when the capacitor 84 is reconnected to the conductor 24a to re-establish current flow therein the additional charge given to the capacitor 84 increases the magnitude of the current flow in the conductor 24a so as to maintain current flow at the desired level. While the charging source 90 may be connected to the capacitor 84 at any time, if this capacitor is charged during periods when it is not storing charge from the conductive loop 24a, a relatively low voltage charging source may be employed since this charging source will be disconnected by a switch 92 during periods when a high voltage is produced across the capacitor 94 during periods of storage of the primary loop current.

A further alternative arrangement which may be employed to supplement the current circulating in the conductive loop 24a, consists in providing a coil indicated generally at 94 around a portion of the loop conductor 24a so as to induce a current in the conductor 24a by electromagnetic induction. In the arrangement illustrated in FIG. 6 the coil 94 surrounds the end portion 26a of the conductor 24a and a current applied to the terminals 96, 98 will result in the electromagnetic induction of an additional current component in the conductor 24a. Obviously, the current source connected to the terminals 96, 98 may be so controlled as to compensate for the above described reduction in the loop current during periods of propulsion of the spacecraft 20.

In those arrangements wherein the loop conductor is a superconductor, some idea of the accelerating force which may be exerted on the spacecraft 20 can be obtained by substituting representative values for the parameters in Equation 6. Thus, if it is assumed that the spaceship is orbiting in a polar orbit at approximately 200,000 meters above the earth the parameter $$\left(\frac{r}{r_o}\right)^4$$

of Equation 6 becomes approximately 1.14. Also, if it is assumed that the loop conductor 24a comprises a single turn and is made of niobium-tin which has a maximum current density of approximately $3 \times 10^{10}$ amperes per square centimeter, and it is further assumed that the loop conductor 24a has a major radius of 10,000 meters (the radius $a$ shown in FIG. 4) and a wire radius of 0.002 meter (the wire radius $b$ of FIG. 4) the value for $F_0$ may be computed from Equation 6 to be approximately 50 Newtons or 5,000 grams force. It is noted that the dimensions $a$ and $b$ in FIG. 4 are greatly distorted relative to each other and the spaceship 20 for purposes of illustration. Under this set of conditions the conductor 24a would carry a current of 4,000 amperes and the mass of the conductive loop 24a would be approximately 65 kilograms, assuming that the density of the niobium-tin conductor 24a is 8,400 kilograms per cubic meter. The acceleration $F_0/M$ would thus be .77 meter/sec.$^2$. For comparison purposes it is noted that an acceleration of 1 G corresponds to 9.8 meters/sec.$^2$.

While the above computed accelerating force appears to be substantial, it will be understood that this value has been calculated without regard to the weight of the cryogenic fluid which may be necessary to maintain the temperature of the conductor 24a in the desired region, and without regard to the weight of the associated spacecraft. Also, it will be recalled that the value $F_0$ corresponds to the maximum force obtained in the direction of the component 44 (FIG. 1) and the maximum value of the $\theta$ directed component 42, which is utilized to accelerate the spacecraft, is smaller and also varies over the accelerating quadrants in the manner shown in FIG. 2. Accordingly, it is understood that the above described computations are intended to illustrate only the manner in which the accelerating force may be calculated for a particular set of assumed conditions. Obviously, if the conductor 24 is not a superconductor, the maximum current which can be forced through this conductor will be substantially smaller than can be achieved when the loop conductor is operated in the superconductive region. The accelerating force developed by the loop conductor will then be substantially smaller than that calculated above. Of course, when the conductor 24 is not a superconductor the various parameters of Equation 4 would be chosen so that the net translational force in the direction of the component 42 (FIG. 1) would be maximized. This means that the area of the conductive loop 24 would be as large as possible commensurate with the physical strength of this conductor, the current passed through this conductor would be maximized and the mass of the conductor 24 would be minimized.

In the arrangement of FIGS. 3 and 4, it is assumed that the current flow through the conductor 24 is of sufficient strength and the conductor sufficiently flexible to cause this conductor to assume a circular loop configuration due to the hoop stress effect of current flow through this conductor. When the loop 24 is in orbit with the space vehicle 20 this loop is essentially weightless and hence the intermediate portion of this loop once it is released from the spacecraft is free to form a random circular configuration. In the event that the conductor 24 is not sufficiently flexible to permit the formation of a loop by virtue of the hoop stress effect due to current flow in the conductor 24, any other suitable arrangements may be employed for positioning the conductor 24 in the form of an extended loop of large dimensions. For example, as one end of the conductor 24 is pushed away from the spacecraft it may be passed through a forming die which gives the conductor a very slight curvature. Since the conductor as it is being ejected is essentially weightless, it will curve around and return to the spacecraft and the forward end of the conductor may then be secured to the spacecraft so that a large loop is formed the diameter of which is dependent upon the curvature imparted to the conductor as it is ejected. After the loop has been thus formed, the forming die may be removed and current supplied to the loop through the portions of the conductor secured to the spacecraft in accordance with any of the embodiments described heretofore.

Also, if the current flow through the conductor 24 is insufficient to cause the conductor 24 to form a circular loop as for example when a loop of large diameter is used and a relatively small current is circulated, a physical supporting arrangement may be employed to hold the conductor 24 in the form of an extended loop. Such an arrangement is shown in FIG. 7 wherein the loop of the conductor 24 is positioned within a flexible tubular sleeve 100. An air supply indicated generally at 102 is provided on the spacecraft 20 and is arranged to fill the closed sleeve 100 with air or other suitable gaseous medium. The sleeve 100 is formed during fabrication so that when filled with air it will assume a generally circular configuration and hence the conductor 24 positioned within the sleeve 100 will likewise assume a similar configuration. Preferably, the sleeve 100 is made of a suitable plastic film having sufficient strength to withstand the pressure built up therein by the supply 102 and the conductor 24 may then simply rest on the inside surface of the sleeve 100 since it is made of insulating material. On the other hand, if the sleeve 100 is made conductive, as for heat reflective purposes, suitable spacers may be employed to space the conductor 24 from the sleeve 100 so that this conductor will not be short-circuited to the housing of the spacecraft 20. Other arrangements may obviously be employed to maintain the conductor 24 in a circular loop configuration. For example, the conductor 24 may be connected to the equator of a large plastic balloon which is carried aloft by the spacecraft 20 in collapsed form and is then inflated in the manner of the Echo project for reflecting radio signals from an orbiting balloon satellite.

Since the conductor 24 is, in the embodiments of FIGS. 3 and 4, unshielded from the sun's radiation, this conductor will assume a relatively high temperature even though it is positioned in space in which the temperature is near absolute zero. However, increasing the temperature of the conductor 24 will increase the resistance of this conductor and hence limit the current carrying capacity of this conductor for a given power loss in this conductor. Accordingly, in the embodiment of FIGS. 3 and 4 the surface of the conductor 24 may either be painted with a radiation reflective material or, in the alternative, this conductor may be enclosed in a suitable sleeve which will shield the conductor from the sun's radiation. For example, the arrangement shown in FIG. 8 may be employed wherein a flexible sleeve 106 is positioned around the conductor 24 and is coated with a suitable reflecting material to shield the conductor 24 from the sun's radiation. The sleeve 106 may be held concentric with the conductor 24 by any suitable spacing means having low heat transfer characteristics and may be provided with small shaded or shielded apertures (not shown) so that the space 108 between the conductor 24 and the sleeve 106 is the same density as the space surrounding the spacecraft 20, i.e., almost a perfect vacuum. With such an arrangement the sleeve 106 will act as an insulator to prevent heat transfer from the inner surface of the sleeve 106 to the conductor 24. In the alternative the sleeve 106 may comprise a multi-layer foil arrangement in which 30 or 40 layers of high reflectivity foil are employed to prevent heat transfer. These layers may be extremely thin and are corrugated or crinkled so that they touch at only a few points. The space between these layers may be essentially evacuated by providing a few pin holes through the layers at random points thereon.

If the transfer of heat inwardly to the conductor 24 is substantially completely prevented the shielded conductor may be of superconductive material such as niobium-tin without requiring an auxiliary cooling system for the conductor as in FIG. 5. Thus, if the reflective properties of the sleeve 106 and the heat transfer inwardly from the sleeve 106 to the conductor 24 are such that the temperature in the vicinity of the conductor 24 does not rise above 15°–20° K. a conductor 24 of niobium-tin will function as a superconductor with essentially zero resistance and may be employed in the circuit arrangements described heretofore without additional cooling facilities which add substantial weight to the overall system. Furthermore, as the maximum operating temperature of superconductive materials is increased the amount of thermal insulation required around the conductor 24 will be less with a consequent reduction in the size of the shielding envelope 106 and a further reduction in weight of the apparatus. While the shield 106 has been shown for purposes of illustration, other suitable arrangements for shielding the conductor 24 from the sun's radiation may obviously be employed.

In the embodiments of FIGS. 5A and 6, the sleeve 60 will also tend to absorb radiation from the sun which will tend to heat up the cryogenic fluid being circulated within this sleeve around the conductor 24a. To minimize such heat transfer, the arrangement of FIG. 9 may be employed wherein a sun shield 110, in the form of a thin, tubular sleeve which is concentrically spaced with respect to the sleeve 60, may be provided to minimize the inward transfer of heat to the sleeve 60 in a manner similar to the sleeve 106 of FIG. 8. Such a shielding arrangement is of particular advantage in the event the cooling fluid is a gas since the cooling effect of a gaseous medium is obviously less effective in maintaining the temperature of the conductor 24a in the superconductive material than if a cooling liquid is used.

While the space propulsion system of the present invention has been described in connection with the magnetic field interaction taking place between the current carrying loop 24 and the earth's magnetic field, it will be understood that the invention may be employed to develop propulsive thrust for the spacecraft in any non-uniform magnetic field. Recent space probe studies have confirmed the fact that non-uniform magnetic fields exist throughout space. Accordingly, the space propulsion system of the present invention may be employed, either separately or in conjunction with other propulsion systems such as the ion power propulsion system, to perform long term space missions of the interplanetary and even the interstellar type. As stated heretofore, a particular and specific advantage of the propulsion system of the present invention is that propulsive thrust is achieved without ejecting any mass of material from the spaceship to provide thrust.

Since the magnetic field distribution in space is as yet uncharted the magnetic field interaction space propulsion system of the present invention can be considered similar to sailing the uncharted seas at the whimsy of the winds in the early days of sea navigation. In a manner similar to the sea navigator, the space sailor utilizing the magnetic field interaction space propulsion system of the present invention will have to acquaint himself with the changing pattern of magnetic fields and search out the maximum gradients to find forces suitable to propel him on his way. While not too much information is available on magnetic fields in space beyond a few geocentric radii of the earth, we do know that bands of charged particles drift around the earth and we have measured anomalies resulting from particles arriving from the sun. In general, these factors indicate sharp gradients in the earth's magnetic field. A space sailor employing the magnetic field interaction space propulsion system of the present invention will try to seek out these sharp gradients to produce larger propulsive forces for the spacecraft, as will be evident from the preceding detailed description.

While various embodiments of the invention have been shown separately for clarity in describing particular features of the invention, it will be understood that these separately described features may obviously be incorporated in the overall system in any desired manner or combination. Furthermore, while particular embodiments of the invention have been illustrated and described it will be understood that many changes and modifications will readily occur to those skilled in the particular arts to which this invention pertains.

What is claimed is:

1. A system for exerting a force on an object moving in a predetermined direction along a path in a non-uniform magnetic field, comprising means for developing an auxiliary magnetic field in the vicinity of said object only during periods when said auxiliary magnetic field interacts with said non-uniform magnetic field to produce a force on said object which tends to accelerate the same in said predetermined direction.

2. A system as set forth in claim 1, wherein said auxiliary field developing means is carried by said object.

3. A system as set forth in claim 1, wherein said object is moving in an orbital path around the earth and said auxiliary magnetic field interacts with the earth's magnetic field to produce said force.

4. A system as set forth in claim 1, wherein said object is moving in a polar orbit about the earth and said auxiliary magnetic field is developed only during periods when said object is moving in predetermined sectors of said polar orbit.

5. A system for exerting a force on an object moving in a predetermined direction along a path in a non-uniform magnetic field, comprising means defining a current conductive loop connected to said object, and means for establishing current flow in said loop to develop a local magnetic field which interacts with said non-uniform magnetic field to produce a force on said object which tends to accelerate the same in said predetermined direction.

6. A system as set forth in claim 5, wherein said object is moving in an orbital path about the earth and current is established in said loop only during periods when said object is moving in predetermined sectors of said orbital path.

7. A system as set forth in claim 5, wherein said loop is formed by an elongated conductor which is initially carried on said object in a compact form and assumes a generally circular configuration when current flow is established therein.

8. A system for exerting a force on a spacecraft moving in a predetermined path in a non-uniform magnetic field, comprising a conductive loop connected to said spacecraft, and means for establishing a flow of current through said loop during time periods related to the movement of said spacecraft within said non-uniform magnetic field so that the magnetic field developed as a result of said current flow interacts with said non-uniform magnetic field to produce a resultant force on said spacecraft which accelerates said spacecraft along said predetermined path.

9. An apparatus for accelerating a space vehicle which is orbiting the earth which comprises, a conductive loop connected to said space vehicle, and means for selectively establishing current flow in said loop during periods when said space vehicle is travelling in a direction in which the earth's magnetic field is increasing in strength.

10. An apparatus as set forth in claim 9, wherein said loop is formed of superconductive material and means for maintaining the temperature of said superconductive material in the region in which said material is superconductive.

11. A system as set forth in claim 1, wherein said auxiliary field establishing means includes a loop of superconductive material, and means for maintaining the temperature of said superconductive material in the region in which said material is superconductive.

12. A system as set forth in claim 5, wherein said current conductive loop is of superconductive material, and means for maintaining the temperature of said material in the region in which said material is superconductive.

13. An apparatus as set forth in claim 9, wherein said loop is of superconductive material, means for maintaining said material at superconductive temperature, a charge storage device, and means for diverting current flowing in said loop into said charge storage device during periods when current flow in said loop is not desired.

14. An apparatus as set forth in claim 13, wherein there is provided means for increasing the charge in said storage device by amounts which compensate for reduction in the strength of said established current flowing in said loop.

References Cited

UNITED STATES PATENTS

| | | | |
|---|---|---|---|
| 3,048,350 | 8/1962 | Cutler | 244—1 |
| 3,088,697 | 5/1963 | Cutler | 244—1 X |
| 3,283,217 | 11/1966 | Cherry. | |
| 3,295,931 | 1/1967 | Hulliger. | |

FERGUS S. MIDDLETON, Primary Examiner

U.S. Cl. X.R.

310—52, 273; 335—216